Oct. 1, 1940.  J. G. RAY  2,216,163

ROTATING-WING AIRCRAFT

Filed July 22, 1936  5 Sheets-Sheet 1

Fig 1.

INVENTOR
James G. Ray
BY
Synnestvedt & Lechner
ATTORNEYS

Oct. 1, 1940.  J. G. RAY  2,216,163
ROTATING-WING AIRCRAFT
Filed July 22, 1936  5 Sheets-Sheet 3

Fig. 3.

INVENTOR
James G. Ray
BY
Synnestvedt & Lechner
ATTORNEYS

Oct. 1, 1940.   J. G. RAY   2,216,163
ROTATING-WING AIRCRAFT
Filed July 22, 1936   5 Sheets-Sheet 4

INVENTOR
James G. Ray
BY
Synnestvedt & Lechner
ATTORNEYS

Oct. 1, 1940.　　　J. G. RAY　　　2,216,163
ROTATING-WING AIRCRAFT
Filed July 22, 1936　　　5 Sheets-Sheet 5

INVENTOR
James G. Ray
BY
Synnestvedt + Lechner
ATTORNEYS

UNITED STATES PATENT OFFICE 2,216,163

ROTATING-WING AIRCRAFT

James G. Ray, Hatboro, Pa., assignor, by mesne assignments, to Autogiro Company of America, a corporation of Delaware Application July 22, 1936, Serial No. 91,838

30 Claims. (Cl. 244—18)

This invention relates to rotating-wing aircraft and more particularly to aircraft having autorotatable wings, especially such as have a plurality of rotor blades or wings mounted to rotate about an upright axis and oscillatable with respect thereto for compensating for variable flight loads such as differential lift, and the invention is particularly well adapted to such a machine of the type now known as "direct control", wherein the rotor is employed not only as the sole or primary means of sustension but also as an important if not the sole controlling organ.

In general, the invention contemplates improvements in the starting of the rotor and the take-off of the craft, considered per se and also in association with the controlling operation during take-off. More particularly the invention contemplates improvement of the structure and operation of a machine of the combined direct control, direct take-off, type; "direct take-off" being a term now applied to that type of rotary winged machine which is capable of taking off or jumping directly from the ground, without forward run, even in substantially still air; a characteristic machine of such general type being exemplified in the copending application of Juan de la Cierva, Serial No. 738,349, filed August 3, 1934.

In this type of craft, the preferred operation comprises: initiating rotation of the rotor by a power drive system, preferably actuated by the forward propulsion engine of the aircraft, so as to raise the rotational speed of the rotor, prior to take off, to a point substantially above its normal autorotational speed, for example 50% to 100% in excess of the normal autorotational R. P. M., so as to store up considerable kinetic energy therein, the individual rotor blades during such starting operation being set at substantially minimum-drag incidence, which is approximately zero pitch position; and, after the desired R. P. M. have been obtained, disconnecting the power drive and practically simultaneously with such disconnection altering the rotor blade pitch by shifting the same to a positive lift incidence (preferably still within the range of autorotational incidence) to effect a direct take-off from the ground, while operating the engine (which drives the propulsive air-screw) at sufficient speed to secure promptly a translational movement adequate to maintain flight, with the rotor then turning autorotationally by virtue of the relative flight wind; and controlling the craft during the take-off by regulating the position of the lift line of the rotor relative to the center of gravity of the machine, preferably by a controllable bodily tilting of the axis of rotation of the rotor hub, whereby the desired attitude of the body of the craft and the desired direction of take-off movement are secured, under full control with little or no forward speed.

Among the primary objects of the invention are: the attainment of such preferred operation, or the equivalent, by a mechanism, preferably automatic or at least semi-automatic, which is structurally relatively simple, positive in action, of substantial safety in operation, characterized by light weight, to a considerable extent preventive of premature or undesired take-off, readily adjustable, and easily inspected and repaired.

More particularly, the invention involves a system in which the rotor starting operation and the rotor blade pitch regulation are coordinated in a novel and improved manner, and in which the mechanism for blade pitch control and the apparatus for tilting control of the rotor are so coordinated as to structure and operation that they are mutually non-interfering; and in the preferred embodiments of the invention these purposes are preferably carried out by mechanism which is to a large extent fluid pressure operated, for example by hydraulic means, which not only accomplishes the objects mentioned, but also assures smoothness of operation, accommodates the individual oscillative or swinging motions of the rotor blades under the influence of flight forces, permits of relative "weaving" or other motions normally occurring between the rotor hub and the body and power plant, and facilitates installation of the system in machines of widely differing size, type, and general arrangement.

The invention further involves an arrangement in which the blades, preferably individually pivoted for flight movements (for example by generally horizontal pivots for up and down flapping, and by generally vertical pivots for fore and aft swinging within the rotative path), are individually pivoted for pitch variation, the path of movement provided by the pitch varying pivots (or, stated in another way, the position of each blade with respect to its pitch varying pivot) being such that the centrifugal force of rotation acting on the several blade elements of the rotor constantly urges them toward the position of maximum pitch; and in which the shifting of the blades to, or holding them in, a position of zero pitch is accompanied by a shortening of the distance between the mass center of the blade and the axis of rotation, so that when the rotor is turning, the mechanism for shifting the blades to a low pitch is opposed by the action of centrifugal force on the blades. Such operation is preferably obtained by including in the root attachment of the blade to the hub a helical thread or worm, the axis of which substantially coincides with the longitudinal axis of the blade, and it is a feature of the invention that the lead of the worm be such, with relation to the coefficient of friction thereof and to the centrifugal force exerted by the blade during rotation, that the blade will be capable of movement automatically to a position of positive pitch (unless restrained as against such movement by the pitch controlling means) under the influence of the centrifugal force of rotation, and I prefer to make the lead of the pitch-varying worm somewhat steeper, about 10% to 80% steeper than the theoretical minimum. It should in fact be made such that the blade will move very rapidly to its position of positive pitch, even though the worm be suffering from lack of lubrication, thereby providing a safe-guard against the pitch of one or more of the blades remaining near zero or the change of pitch of one blade lagging behind the change of pitch of another, which could cause extreme roughness in the rotor at the moment of take-off.

In order, however, that the force required to shift the blade to or hold it in its position of zero pitch be not too great when the rotor is turning at maximum R. P. M. for take-off, thus in order to avoid excessive size and weight of the blade pitch regulating mechanism and excessive operating pressures, it is important not to make the lead of the screw-threaded pitch varying mounting excessively steep. Furthermore, if it is too steep, the radial travel of the blade (that is, the travel axially of the worm) will be excessive, it being readily appreciated that it is desirable to avoid excessive variation in the distance of the center of mass of the blade from the center of rotation of the hub, during the pitch changing operation, since otherwise it might be difficult to obtain perfect dynamic balance of the rotor as a whole, in both the minimum and maximum pitch positions of the blades, especially in rotors designed for a large range of pitch variation.

More particularly, the invention involves: insertion of the screw-threaded pitch-varying mounting in the extension link between the flapping pivot and the drag pivot; the location of an individual hydraulic piston device on the extension link for each blade, adapted to actuate the blade from its position of maximum pitch to its position of minimum pitch; the actuation of the individual piston devices from a common hydraulic mechanism associated with or mounted in the rotor head or hub, through the intermediation of flexible conduits, and the actuation of this central mechanism by a control member in the body of the craft, through the intermediation of either hydraulic or mechanical means of a flexible nature; and preferably also the coordination of this pitch changing mechanism with the means for connecting the rotor starter to the engine. Still further, the invention contemplates actuation of the rotor starter by means of a hydraulically operated clutch; which is preferably supplied with oil from the oil pump of the propulsion engine which also drives the rotor starter. Thus a common oil supply and oil pump serves to lubricate the propulsion engine and to actuate the rotor starter clutch; and the control of the fluid pressure to this clutch is preferably coordinated with the rotor blade pitch changing mechanism. In addition to the general advantages resulting from this unified and coordinated arrangement, there is a special advantage in employing the direct power of the engine oil pump to operate the rotor starter clutch, since this insures the existence and adequacy of the force for application of the clutch whenever the engine is turning and a jump take-off is about to be made.

In addition to the foregoing, the invention involves an adjustable interconnection between the blade pitch changing mechanism and the rotor starter mechanism whereby desired serial action thereof may be assured, particularly upon the release for take-off, and the provision of means whereby the rotor starter may be operated independently of the blade pitch changing mechanism, so that the craft may alternatively be operated with its direct control characteristics but without the direct take-off, under conditions where the latter maneuver is not needed, or for the independent control of blade pitch and rotor starter. Still further, the invention involves improvements in the mounting of the tiltably controlled hub, and in the hub structure itself including the rotor driving and tachometer actuating connections, whereby to compactly incorporate the direct control and direct take-off features, within a small compass of size and weight, while preserving full freedom of actuation of the starter, the direct control and the blade pitch varying mechanism, as well as the usual individual swinging movements of the blades. Other structural improvements in the rotor head itself are also involved.

How the foregoing, together with such other objects and advantages as are incident to the invention, are preferably attained will be evident from the following description, taken together with the accompanying drawings, wherein.

Figure 1:
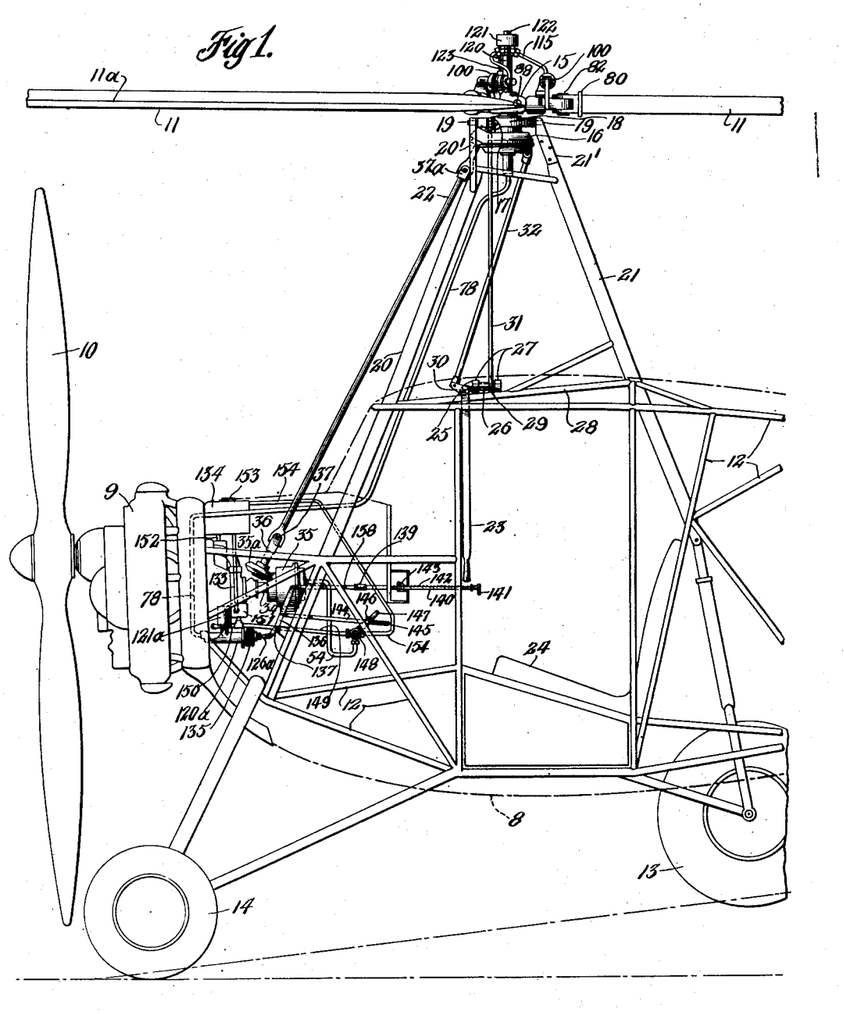
Figure 1 is a skeleton side view of the forward portion of an aircraft embodying the present invention in preferred form.

Referring first to the embodiment shown in Figures 1 to 5 inclusive, and particularly to the general view of Figure 1, it will be seen that the aircraft 8 (shown in dot and dash outline) has the usual means of propulsion comprising an engine 9 and propeller 10, and for sustension and control it has a plurality of (in this instance three) elongated rotative wings 11, only two of which are here shown, the same being broken off to accommodate the drawing to the size of the sheet. While any type of body and undercarriage may be employed so far as the present invention is concerned, I have for convenience illustrated a fuselage framing of metal tube construction, some of the elements of which are indicated at 12, of a general nature similar to that shown in the copending application of Agnew E. Larsen, Serial No. 39,671, filed September 9, 1935, issued April 25, 1939 as Patent No. 2,155,426 and an undercarriage also similar to that disclosed in said application, and comprising, in general, a main central landing wheel 13 and a pair of forwardly disposed wheels one of which is shown at 14.

The rotor hub 15 is mounted above the body, within a shell or housing 16, for pivotal inclination with respect to the center of gravity of the craft, by means of a transverse pivot 17 tiltably securing said casing in a gimbal ring 18 and a longitudinal pivot 19 tiltably securing said gimbal ring upon the upward extensions 20', 21', of the forward and rearward pylon legs 20 and 21, which latter are rigidly secured in and in effect form a part of the body framing. Each rotor tilting fulcrum or axis (17 and 19, respectively) may be, and in fact, in this embodiment, is composed of a pair of aligned pivot devices or trunnions; the transverse trunnion 17 for longitudinal rotor tilt being provided by a pair of pins extending inwardly from the gimbal ring 18 to the rotor hub casing 16, and the longitudinal fulcrum 19 for lateral rotor tilting being composed of a pair of pins, one extending rearwardly of the gimbal ring into a bearing formed in the support member 21' and the other extending forwardly into a bearing provided in the support member 20', which latter member is made substantially circular to accommodate the rotor starter or drive shaft 22 hereinafter to be referred to.

Control of the rotor is effected by means of the hanging stick 23, mounted in the cabin within convenient reach of the pilot's seat 24, by a system of linkages, as follows: The upper end of the stick is pivoted at 25 upon one end of a rock shaft 26 which is mounted in bearings 27 secured on a fixed strut 28; the rock shaft carrying a laterally projecting arm or lever 29, and the stick carrying a forwardly projecting arm or horn 30, a lateral control rod 31 and a longitudinal control rod 32 being, respectively, pivotally connected to said arms 29 and 30 at their lower ends, and being pivotally connected at their upper ends to the gimbal ring 18 and the hub housing 16, respectively. Thus longitudinal movement of the control stick 23 effects corresponding longitudinal tilting of the rotor hub, and lateral tilting effects lateral motions of the rotor hub, the principle of this direct-control being fundamentally the same as that shown, for example, in the copending application of Juan de la Cierva, Serial No. 645,985, filed December 6, 1932, and in the above-mentioned copending application of Agnew E. Larsen, Serial No. 39,671; the interrelationship between the hub mounting and control mechanism, however, and the direct take-off mechanism of the present invention involving certain novel arrangements of structure which will be brought out more fully hereinafter.

Turning, now, to the driving mechanism for starting and/or overspeeding the rotor prior to take-off, it will be seen that the engine crankshaft 33 (Fig. 2) is extended rearwardly by means of a coupling device 34 for connection with the rotor starter clutch which is housed within the casing 35. In an extension 35a of this casing is a gear which actuates the rotor drive shaft 22 through the intermediation of a slip-joint 36 and a universal joint 37, there being a similar universal joint 37a adjacent the upper end of the shaft, for reasons which will appear further on.

Figure 2:
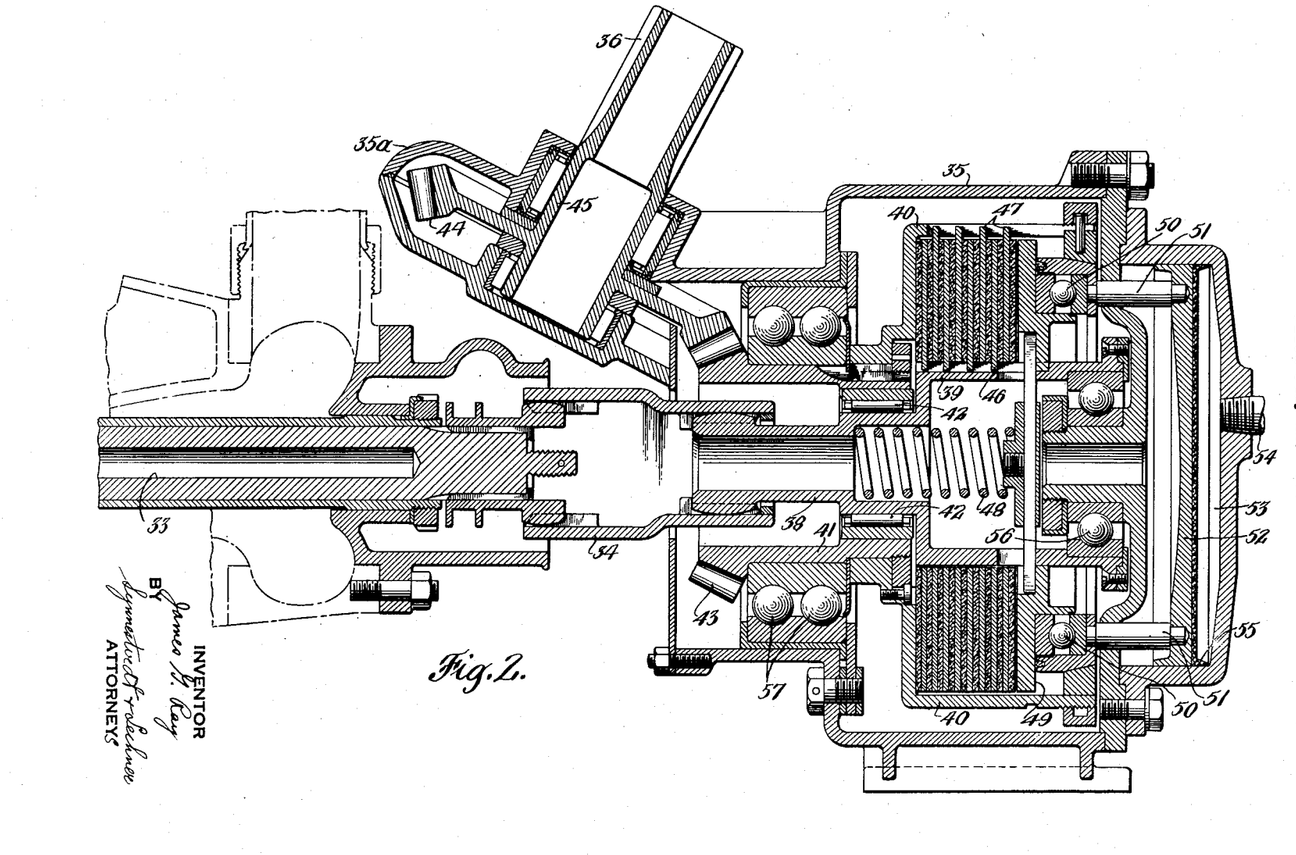
Figure 2 is a substantially enlarged view, in vertical longitudinal section, through the lower portion of the rotor driving mechanism of the machine of Figure 1.

The details of the lower end of the driving mechanism, including the clutch, appear in Figure 2, wherein it will be seen that the separable coupling member 34 is connected at its outermost end to a hollow shaft 38 which is connected to or integral with the driving member 39 of the clutch. The driven member 40 is connected to a hollow shaft 41 which surrounds the shaft 38, (there being interposed bearings 42) and carries a driving bevel pinion 43 which is in constant engagement with the driven bevel gear 44 fixed on the shaft member 45 which carries one element of the slip-joint 36. Transmission of power from the clutch driving element 39 to the clutch driven element 40 is accomplished by means of a series of interleaving annular disks 46 and 47, respectively splined on said members 39 and 40. These disks are normally relieved of pressure by means of a spring 48 which tends to force outwardly the clutch pressure plate 49; and contrariwise the engagement of the clutch is effected by exerting pressure upon the plate 49 (toward the left when viewed in Figure 2), this being accomplished through thrust bearings 50 by means of the pins 51 which are actuated by a piston 52 when fluid pressure is admitted into chamber 53 through pipe 54. A cup packing 55 is preferably applied to the piston. Additional bearings 56 and 57 between relatively moving parts of the clutch are provided, but the other details of construction of this portion of the mechanism need not be further described as it would be unnecessary to an understanding of the present invention.

Figure 3:
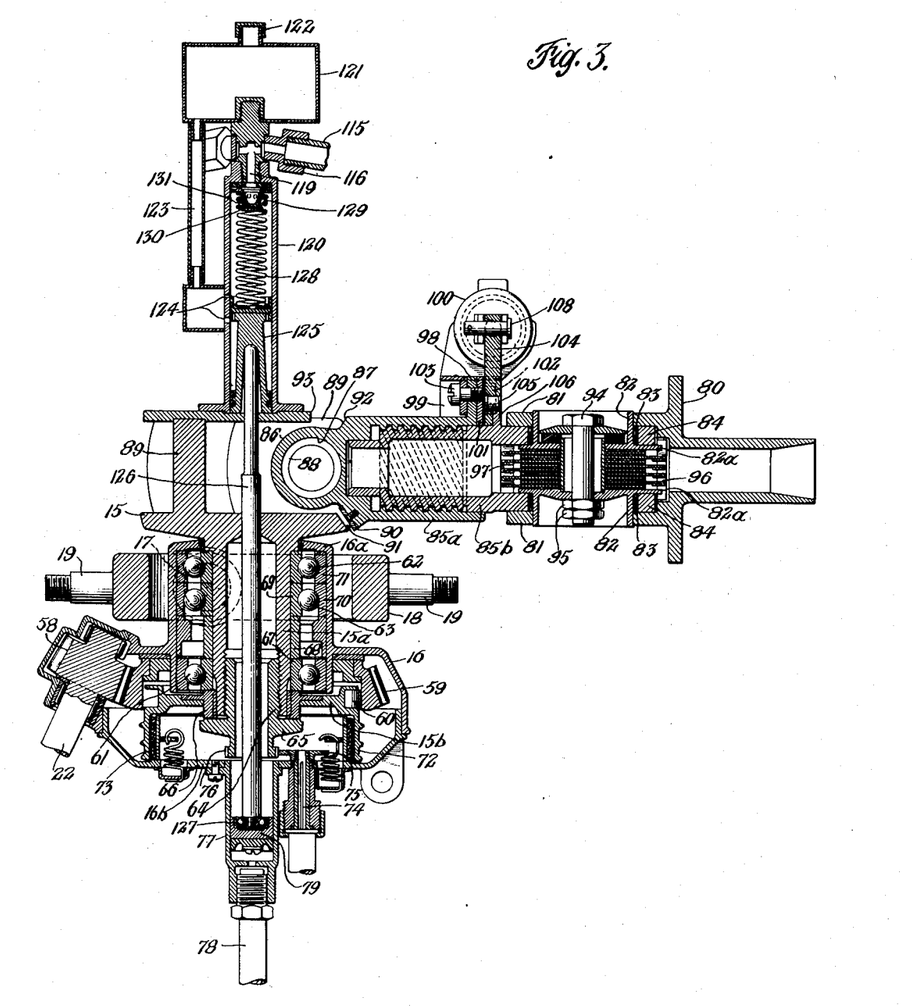
Figure 3 is an enlarged view, in vertical section, of the rotor head and associated parts, of the machine of Figure 1, including details of the upper portion of the drive mechanism, the tiltable mounting for the rotor, the blade incidence varying mechanism, etc.

As seen in Figure 3, the rotor drive shaft 22 at its upper end carries a pinion 58 which is in constant mesh with a ring gear 59, the bearings for the shaft, etc. being mounted in or on the hub casing 16 for movement therewith when the hub axis is tilted; the drive-shaft slip-joint 36 and universals 37 and 37a readily accommodating the controllable tilting of the rotor hub. The ring gear drives the rotor hub 15, by means of its downwardly extending tubular portion 15a and the laterally extending flange 15b, through the intermediation of an overrunning clutch, one of the rollers of which is shown at 60, and as long as the ring gear is being driven at a speed which tends to run faster than the autorotational actuation of the rotor itself, it will drive the hub, the latter being free to turn within the radial bearings 61, 62 and the lift thrust bearing 63. The lift thrust is carried from the hub sleeve 15a of the hub casing 16 through the following series of elements: The sleeve 64, flange 65, shoulder 66, bearing race 67, spacer sleeve 68, internal race 69 of the thrust bearing, external races 70, 71 and the inturned flange 16a of the hub casing 16.

Below the mechanism thus described, the overrunning clutch flange 15b carries a downwardly extending drum 72, within which is a brake band 73 having the usual friction lining, and operated by mechanism extending into the cabin, which need not here be described. The brake is, however, enclosed by the bottom cover 16b of the hub casing, which also serves to support the upper end of the tachometer drive shaft 74 which is coupled by gears 75 and 76 with the lower end of the sleeve member 64 which rotates with the hub. The bottom cover of the hub casing also carries a tubular extension 77 which serves as a support and connection for the upper end of the oil pipe 78 and is internally formed as a cylinder to receive the hydraulically actuated piston 79 of the blade incidence changing mechanism.

Figure 4:
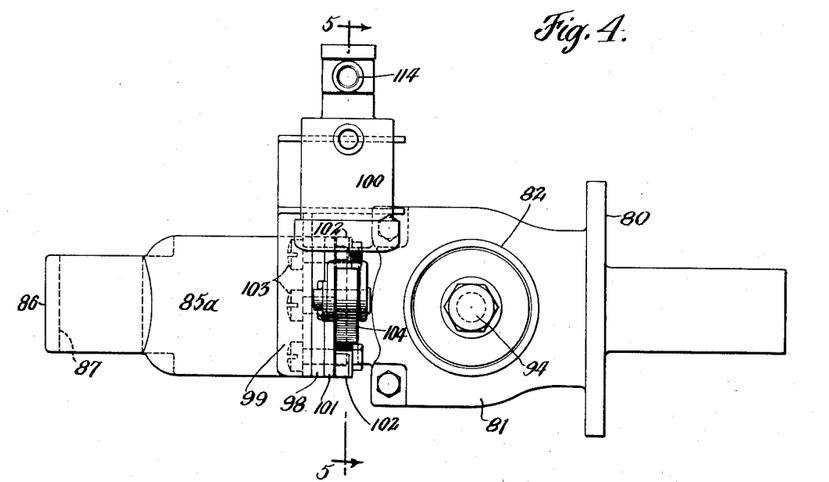
Figure 4 is a plan view, to a larger scale than Figure 3, of the blade root attaching mechanism and pitch varying device associated therewith, for one of the rotor blades.
Figure 5:
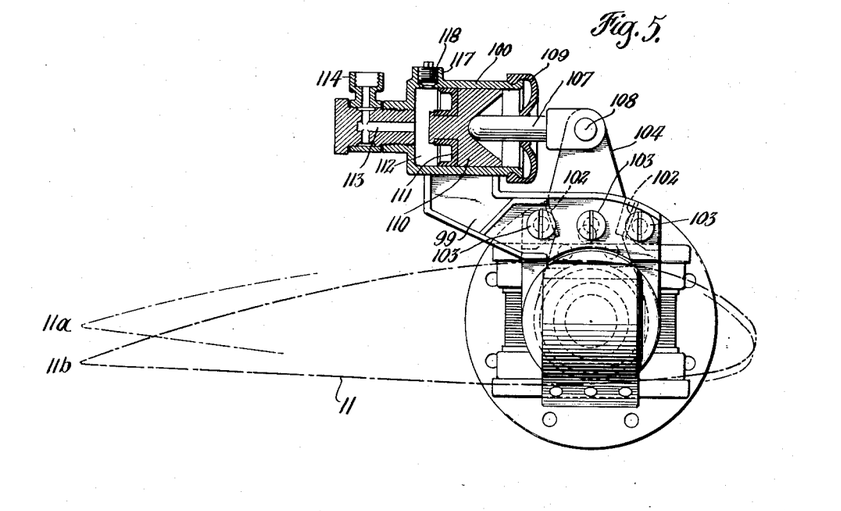
Figure 5 is a view, partly in section and partly in elevation, taken substantially on the line 5—5 of Figure 4.

Referring now to Figures 3, 4 and 5, it will be seen that each blade 11, the sectional contour of one of which is shown in Figure 5, is mounted on the hub in the following manner. The blade airfoil is built up upon a spar (not shown) which is secured to the root end fitting 80 which carries a pair of ears 81, the latter being apertured to receive the vertical articulation members 82, 82, for pivotation of the blade about a vertical or drag axis. The members 82 are journaled, as by needle bearings 83, in the bearing raceways formed by the upper and lower apertured fork members 84, 84, of the extension link member 85b. The extension link is completed by a socket member 85a, which at its inner end is formed with a heavy lug 86, horizontally bored at 87 to receive the flapping pivot pin 88, the ends of which are journaled in a pair of ears 89 which are integral with the hub 15.

Limitation of the blade movement in a drooping direction is obtained by the cooperating surfaces 90 and 91, and limitation of excessive upward flapping by the cooperating surfaces 92 and 93. Control of swinging of the blade fore and aft in the plane of rotation is secured by means of a suitable damper or shock absorber, for instance of the friction type, comprising a series of annular disks compressed between the flanges 82a of the members 82 by means of the bolt 94 and the adjusting nuts 95, alternate disks being splined to the root end fitting of the blade at 96 and the others to the extension link at 97. The latter arrangement is a very efficient one, since it incorporates the friction damper in the space necessarily provided between the forked members 81, and utilizes certain elements commonly as parts of the damper assembly and of the articulation assembly. Certain novel features of this mechanism are claimed in the copending application of Agnew E. Larsen, Serial No. 106,343, filed October 19, 1936, issued April 25th, 1939 as Patent No. 2,155,427.

It will be readily seen from Figure 3 that the shaft part 85b of the extension link is screwed into the part 85a thereof by means of a worm thread connection, in this instance a sextuple or helical thread, by which the change from zero lift pitch at start to about 4° jump-off and flying pitch is obtained, subject to the control of the mechanism hereinafter to be described. Since the lead of this worm is somewhat critical, and will require calculation for different rotors, in which the individual blade weight, the maximum take-off R. P. M. and the coefficient of friction of the worm will be different, I will here give a specific example of an assembly which has been found in practice to be satisfactory, from which other examples may be calculated by those skilled in the art.

For a rotor of three blades, each blade weighing 35 lbs. and normally turning in flight by autorotation at 190 R. P. M., having a minimum practical autorotational speed of approximately 100 R. P. M., and subjected to a starting mechanism capable of overspeeding the rotor by about 50% above the normal autorotational speed, (i. e., to a speed of about 275 or 285 R. P. M. for the jump-off), a worm of the following characteristics has been found to fulfill the requirements mentioned in the forepart of this specification. Both the female member 85a and the male member 85b are of S. A. E. 3435 steel (normalized and heat treated), the former having an overall thread diameter of 1.937 inches and a diameter at the root of the threads of 1.687 inches with a pitch (i. e., axial spacing between thread centers) of ¼ inch, and the lead being 1½ inches axial movement per revolution of the thread; and the latter member being configured to fit the former with close clearance. A sextuple acme thread is used in this example.

It is necessary that the numerical value of the tangent of the angle of the worm thread should be above that of the normal static coefficient of friction, preferably by about 10% to 80%. In the above example, the average coefficient of friction of the worm, when well lubricated, was found to be about .14, with variations due to slight inaccuracies in the thread surfaces and the differences between static and sliding friction, so that under some conditions the static coefficient was in such a thread about .18, and this might be a little higher if the lubrication is deficient. The worm as above described, having a lead of about 1½ inches, has a thread angle with a tangent of approximately .26. Thus in this instance the tangent of the thread angle (.26) is about 144% of the figure representing the normal static coefficient of friction (.18), or in other words 44% greater, which is about midway of the above-mentioned range of 10% to 80%.

There are also other factors which may influence the choice of ratio between the tangent of the thread angle and the coefficient of friction of the thread. For instance, if the relative locations of the sectional center of pressure and sectional center of gravity of the blade are such that a negative pitching movement is at any time imposed upon the blade in flight, it is important that the thread angle be sufficiently great that the centrifugal action of the blade will assure maintenance of the blade at its normal positive pitch (as against the force of any such torsional or pitching moment) throughout the normal range of autorotational speeds of the rotor. Thus, assuming that an ice formation on a blade of the rotor given in the above example were to cause the rotational speed to fall to a point near the minimum practical autorotational speed, (100 R. P. M. in the above example) the angle of the worm thread should be such that the centrifugal force of the blade at such rotational speed will be adequate to hold the blade at its intended incidence as against the negative pitching moment, if the blade by its design has such a moment.

On the other hand, if the pitch control mechanism is designed to force the blade to zero pitch, for example at the moment of landing, when the rotor is turning at normal autorotational R. P. M. or greater, the power exerted by the pitch controlling mechanism will have to be sufficient to overcome, through the power amplification of the worm, the centrifugal force of the blade plus the static friction of the worm; and in order not to require too powerful a pitch controlling mechanism, the worm should not have too steep a thread, and tests have shown that the tangent of the worm thread angle should lie somewhere between 110% and 180% of the normal coefficient of static friction, preferably in the middle region of said range.

The zero pitch position, i. e., that for over-revving prior to take-off, is shown in Figure 1, in which the trailing edge 11a of one of the blades is shown in the raised position corresponding with the showing at 11a in Figure 5. The parts of the mechanism as seen in Figures 3, 4 and 5 are shown in flight position, the trailing edge of the blade being then at the position 11b (Figure 5) corresponding to 4° or 5° positive lift incidence calculated with relation to a plane perpendicular to the rotor axis. With a worm mounting as described, the centrifugal force of rotation acting upon the blade elements of the rotor will be sufficient at any speed within the autorotational range to shift the blades suddenly, by virtue of the lead of the worm, to the positive lift incidence position represented by the heavy dot and dash line 11b of Figure 5, unless restrained by the mechanism now to be described. Nevertheless, the worm, as above described, is not so steep as to place too great a burden upon the restraining mechanism, even at the above mentioned maximum R. P. M. of the rotor when driven by the starter.

On member 85a of the extension link there is an upturned flange 98, on opposite sides of which are rigidly clamped, respectively, a bracket member 99 for carrying the hydraulic cylinder 100 and a segment 101 which carries a pair of stops 102, this assembly being clamped together by screws or the like 103. Angularly oscillatable between the faces of stops 102 is an arm 104 which is riveted at 105 to a flange 106 integral with member 85b of the extension link. The clearance between either stop 102 and the arm 104, when the latter is in one extreme or the other of its angular throw, is equal to the desired pitch adjustment of the blade, in degrees. A piston rod 107 is pivoted at 108 upon the upper end of the arm 104, and extends through the rubber shield or cap 109 into engagement with a piston 110 reciprocable in cylinder 100. A cup packing 111 prevents leakage of oil from the chamber 112 around the piston, and this chamber communicates by passage 113 with the nipple 114, which is connected by a flexible conduit 115 to one of the nipples 116 adjacent the top of the rotor hub. It should here be noted that the cylinder 100 may have a port 117 for escape of air when the system is initially filled with oil, which is then closed by a plug 118.

The three nipples 116, one for each blade, connect to a central passage 119 leading downwardly into the cylinder 120, which latter is mounted on the top of the rotor hub and serves in turn to carry an oil reservoir 121 which may be filled from time to time upon removal of the closure cap 122. This reservoir feeds the cylinder 120 by means of the gravity feed passage 123 and the ports 124. A piston 125 is reciprocable vertically in the cylinder 120, under the influence of the stem 126, which extends downwardly through the center of the rotor hub and has an anti-friction bearing connection 127 with the lower piston 79.

Upon upward movement of the piston 79 (upon delivery of fluid under pressure through the pipe 78), the stem 126 is forced upwardly, thereby carrying piston 125 upwardly, and sealing the uppermost of the ports 124. As the piston 125 continues its upward motion, against the pressure of spring 128, it forces the oil entrapped in cylinder 120 through an annular series of holes 129 of the rubber valve member 130, and contracts the flexible backing member 131 so that the oil passes upwardly between said two members and through the passage 119, thence outwardly through the flexible conduits 115 to actuate the individual pistons 110 for the several rotor blades, whereupon they are moved to their zero pitch position, indicated at 11a in Figure 5.

It should now be pointed out that for the particular example of rotor and worm hereinabove described, the hydraulic cylinder 100 for each individual blade should desirably have a piston face area of about one square inch, operating through a lever arm 104 of about 3⅛ inches length from the axis of rotation of the worm. A suitable normal operating pressure for this hydraulic system is 300 lbs. per square inch; which is sufficient to hold the blades at zero pitch, throughout the entire range of operating speeds of the rotor, even when power-driven at maximum R. P. M. The system shown, however, will be capable of giving pressure of 400 lbs. per square inch in the individual blade operating cylinders, if necessary.

Upon release of the fluid pressure against the lowermost central piston 79, the blades will immediately and automatically go to the positive incidence position shown at 11b, in Figure 5, forcing the piston 110 to the position shown in that figure, and thereby driving some of the oil out of the cylinder 100, through pipe 115 and passage 119, and by unseating the valve 130, pass into cylinder 120. Even in this release position, a slight pressure is maintained in that part of the system extending from the valve 130 to the individual blade cylinders 100, owing to the pressure of spring 128 upon the base of valve 130, and this prevents the possible accumulation of air pockets in the system.

The control of the fluid under pressure through pipe 78 to actuate piston 79 (Figure 3) will now be described, with reference to Figure 1. Mounted at the rear of the engine 9 is a cylinder 120a similar to the cylinder 120 shown at the top of Figure 3, which may be replenished by a reservoir 121a similar to the reservoir 121 but mounted upon the side of the cylinder instead of upon an end thereof. The delivery of oil under pressure from cylinder 120a through pipe 78 (which extends upwardly along the front leg 20 of the pylon to cylinder 77 at the hub) is effected by means of a piston rod 126a, preferably entering the cylinder 120a through a rubber diaphragm or shield 135; said piston stem or rod 126a being pivotally coupled to the lower end of a lever 136 which is pivoted at 137 on a fixed part of the craft. The extreme upper end of the lever 136 is pivotally connected to a link 138 to which is rotatively connected, by any suitable rotatable push-and-pull connection or joint 139, to a push-and-pull rod 140 having an operating handle or knob 141 and ratchet teeth 142 engaging a pawl 143.

When the handle 141 is pulled straight back to the position shown in Figure 1, the plunger or piston stem 126a (moving inwardly) actuates the piston in cylinder 120a to move the rotor blades to their zero pitch position, and the pawl 143 will hold the mechanism in that position, until handle 141 is rotated to disengage the teeth 142 from the pawl 143, whereupon the rod 140 may be released or pushed inwardly, thus allowing the blades to go to their take-off and flight position.

In order that the rotor starter may be operated in synchronism with the blade pitch variation, the lever 136 carries a link 144 which is adjustably coupled by a slot 145 and wing nut 146 or the like to the operating handle 147 of a valve 148. In the position shown, this valve connects pipe 149 to rotor starter clutch operating pipe 54, pipe 149 being a branch pipe taking oil under pressure from the main engine feed pipe 150 which is fed by the engine oil pump 151. The pump takes oil from main oil tank 134 by way of pipe 133, and the normal return circulation from the engine to the tank or reservoir is by way of pipe 152. For replenishing the tank 134, there is provided a filling plug 153.

When the control handle 141 is pushed inwardly to release the blades to their take-off incidence, the valve 148 is actuated through linkage 144 and handle 147 to shut off pipe 149, and to connect the clutch pipe 54 to a pipe 154 which returns oil to the reservoir 134 as the clutch goes to release position, and the adjustment of the slotted connection is made such that immediately after release of the clutch the blades are released to move to their positive pitch for jump take-off.

If it be desired at any time to operate the machine in the ordinary way heretofore known, without the use of the jump take-off, or if it be desired to separately control the starter clutch and the blade pitch, the wing nut or other suitable device 146 (which couples the starter clutch valve handle 147 to the link 144 connected to incidence control lever 136), may be uncoupled. Thus, with the jump-off control handle 141 pushed all the way in (to the left in Figure 1) to its inoperative position, the valve handle 147 can be freely moved to operate the rotor starter clutch quite independently of the blade incidence-varying system, the slot 145 permitting free sliding of the loosened wing nut or other fastener 146.

Figure 6:
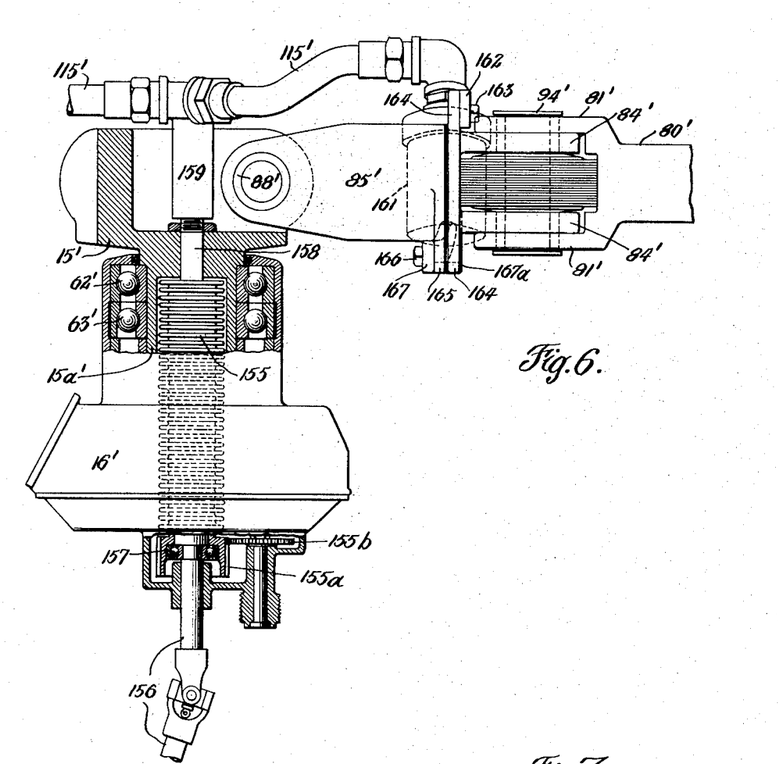
Figure 6 is a view similar to Figure 3, but partly in elevation, illustrating a modification of the invention.
Figure 7:
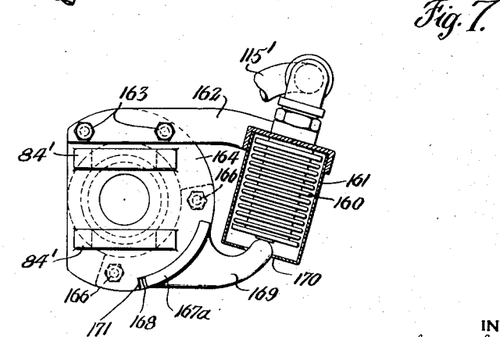
Figure 7 is a fragmentary view of the mechanism of Figure 6, viewed from the right of that figure, with certain parts omitted and others shown in section.

Turning now to Figures 6 and 7, it will be seen that in this modification the rotor hub casing 16', and the hub 15' itself, may be in general similar to the arrangement shown in Figure 3, the casing 16' being adapted for tiltable mounting by a gimbal ring arrangement (not shown) similar to the gimbal ring 18 of Figure 3. Likewise, the blade root fitting 80' is secured to the hub by means of a vertical or drag hinge axis 94' articulating the forks 81' and 84', an extension link 85' having an internal worm similar to that shown in Figure 3, and a horizontal or flapping hinge 88', there being individual flexible hydraulic tubes 115' for the several blades, etc. The hub is mounted to rotate in bearings 62', 63', etc., the remainder of the mechanism within the hub casing being substantially similar to that shown in Figure 3, with the exception that the internal tubular sleeve 15a' of the hub is secured adjacent its lower end by an external assembly nut instead of the internal nut 65 of Figure 3.

This leaves a clear cylindrical space within the hub member 15a', which is taken up by a "Sylphon" member, or equivalent metallic bellows 155 which is sealed at its lower end. Since the operating connection in this embodiment comprises a flexibly jointed non-rotative push rod 156, extending upwardly from the cockpit to the hub casing, and since the bellows diaphragm 155 rotates with the hub, there is provided a thrust ball bearing, or other rotative connection 157 between the upper end of the push rod 156 and the lower end of the "Sylphon" 155. To minimize the number of parts, the lower end of the Sylphon, which rotates with the hub, is used to actuate a tachometer driving gear 155a which is of large axial dimension, so that it drives the driven gear 155b whether the "Sylphon" is compressed or expanded.

The upper end of the "Sylphon" communicates by a pipe 158 with a central fitting 159 to which is coupled the three flexible branch conduits 115', which are respectively connected to individual blade operating "Sylphons" 160. Each of the latter, as seen in Figure 7, is mounted in a guiding cylinder or casing 161, and is rigidly secured at its upper end to the arm 162 which is fastened by bolts 163 to the flange 164 which forms a part of the male member of the threaded connection. The other member of the pitch-varying assembly carries a flange 165, on which is secured by bolts 166 a bracket 167, the latter having an arcuate shoulder 167a so as to work within a similar arcuate slot 168 formed in the flange 164. Bracket 167 also carries an arm 169 which extends upwardly through an aperture 170 in the shell 161 for contact with the sealed bottom of the "Sylphon" 160.

When upward pressure is exerted upon the push rod 156, the central "Sylphon" or bellows diaphragm is compressed, and the fluid therein is forced outwardly through connections 158, 159 and 115' into the individual blade "Sylphons" 160, causing them to expand. The individual "Sylphon" 160 is shown in Figure 7 in its contracted position. When it is expanded it bears down upon the arm 169 and forces the arcuate member 167a against the stop shoulder or face 171 of the slot 168. The throw permitted by the slot is equal to the desired movement of the blade mounting to effect a change from zero pitch to flight pitch of the blade.

Among the advantages incident particularly to the modification shown in Figures 6 and 7 may be mentioned the fact that the hydraulic portion of the mechanism is entirely sealed and self-contained. Furthermore, the central operating "Sylphon" is mounted entirely within the hollow rotor hub, where it utilizes about the only remaining space in the rotor head assembly and cuts down the number and size of external parts, thus reducing parasite drag.

I claim:—

1. In an aircraft having a sustaining rotor, a hub, a blade, and mechanism for connecting the blade to the hub including cooperating parts one connected with the blade and the other with the hub, the parts being relatively rotatable substantially about the longitudinal axis of the blade and having cooperating threads providing for relative axial movement during rotation thereof, the direction of threading being related to the leading and trailing edges of the blade so that axially inward movement of the blade decreases the incidence thereof and axially outward movement increases the incidence, and the threading having a lead sufficient to effect an increase of incidence by virtue of the centrifugal action of the blade, and means operative at the will of the pilot for controlling the incidence during rotation of the rotor.

2. In an aircraft having a sustaining rotor, a hub, a blade, and mechanism for connecting the blade to the hub including cooperating parts one connected with the blade and the other with the hub, the parts being relatively rotatable substantially about the longitudinal axis of the blade, and having cooperating threads providing for relative axial movement during rotation thereof, the direction of threading being related to the leading and trailing edges of the blade so that axially inward movement of the blade decreases the incidence thereof, and vice versa, the pitch of the threads being such that the action of centrifugal force incident to rotation of the rotor serves to axially outwardly displace the blade and thus turn the blade from a lower to a higher incidence, and positively controllable means for relatively rotating said parts to change the blade pitch.

3. In an aircraft having a sustaining rotor, a hub, a blade, and mechanism for connecting the blade to the hub including cooperating parts one connected with the blade and the other with the hub, the parts being relatively rotatable substantially about the longitudinal axis of the blade and having cooperating threads providing for relative axial movement during rotation thereof, the direction of threading being related to the leading and trailing edges of the blade so that axially inward movement of the blade decreases the incidence thereof, and vice versa, releasable control means for retaining said parts in a position in which the blade pitch is substantially zero and the pitch of the threads being such that the action of centrifugal force incident to rotation of the rotor serves to axially outwardly displace the blade and thus turn the blade from a lower to a higher incidence.

4. In an aircraft sustaining rotor, a hub, a blade, and mechanism for connecting the blade to the hub including an internally threaded member secured to the hub, a cooperating externally threaded member secured to the blade, a pair of lever arms respectively secured to said members, and fluid pressure means cooperating with said arms for effecting relative rotation of the threaded members.

5. In an aircraft sustaining rotor, a hub, a blade, and mechanism for connecting the blade to the hub including an internally threaded member secured to the hub, a cooperating externally threaded member secured to the blade, a pair of lever arms respectively secured to said members, and fluid pressure means cooperating with said arms for effecting relative rotation of the threaded members to decrease the blade pitch, the axis of relative rotation of said members being substantially coincident with the longitudinal axis of the blade and the direction of threading being related to the leading and trailing edges of the blade so that axially outward movement of the blade occurs under the influence of centrifugal force whereby to increase the incidence thereof.

6. In an aircraft, a sustaining rotor comprising a hub, a blade, and mechanism for connecting the blade to the hub including cooperating parts one connected with the blade and the other with the hub, the parts being relatively rotatable substantially about the longitudinal axis of the blade and having cooperating threads providing for relative axial movement during rotation thereof, the direction of threading being related to the leading and trailing edges of the blade so that axially inward movement of the blade decreases the incidence thereof, and vice versa, and releasable control means operable from the cockpit of the craft for rotating said parts in a direction to decrease the incidence of the blade.

7. In an aircraft, a sustaining rotor comprising a hub, a blade, and mechanism for connecting the blade to the hub including cooperating parts one connected with the blade and the other with the hub, the parts being relatively rotatable substantially about the longitudinal axis of the blade and having cooperating threads providing for relative axial movement during rotation thereof, the direction of threading being related to the leading and trailing edges of the blade so that axially inward movement of the blade decreases the incidence thereof, and vice versa, releasable control means operable from the cockpit of the craft for rotating said parts in a direction to decrease the incidence of the blade, said control means including lever arms associated with the said parts, a fluid pressure device adapted to react between said lever arms, and fluid pressure actuating means extended from said device to the hub.

8. In an aircraft sustaining rotor, a hub, a threaded part pivoted to the hub on an axis providing freedom for upward and downward movement of said part, a cooperating complementarily threaded member, a blade secured to said member, and control means connected with said member for effecting relative rotation of said threaded part and member including a flexible control element extended therefrom to the hub.

9. An aircraft having a sustaining rotor including a hub and a plurality of blades connected therewith, pivot means for the blades providing for oscillation thereof in a direction transverse their rotative path of travel, additional pivot means located outboard of the first pivot means and providing for pitch change movements of the blades, and mechanism for controlling the pitch change movements including a fluid pressure device associated with the hub and rotatable therewith, a non-rotative actuating member for said device, individual fluid pressure elements for the several blades located outboard of said first pivot means for changing the pitch thereof, and flexible connections between said elements and said device, whereby actuation of said device conjointly actuates all of said elements.

10. The combination, in an aircraft, of a sustaining rotor comprising an upright rotatable hub and a plurality of autorotatable blades secured thereto by pivot mechanism including for each blade a threaded worm device the axis of which is substantially coaxial with the longitudinal axis of the blade for effecting blade pitch variation, starter mechanism for initially substantially overspeeding the rotor above its normal autorotational flight speed, the screw direction of the worm and its coefficient of friction being such that the blade, if unrestrained, will move thereon to a higher pitch under the influence of the centrifugal force of rotation, and the tangent of the thread angle of the worm device being in a range between 110% and 180% of the normal static coefficient of friction of the worm device, and mechanism operable at the will of the pilot to move said blades on their worm devices to a reduced pitch position including means adapted to hold the blades in such reduced pitch position as against the action of centrifugal force thereon at the maximum rotational overspeed induced by said starter.

11. The combination, in an aircraft, of a sustaining rotor comprising an upright rotatable hub and a plurality of autorotatable blades secured thereto by pivot mechanism including for each blade a threaded worm device the axis of which is substantially coaxial with the longitudinal axis of the blade for effecting blade pitch variation, starter mechanism for initially substantially overspeeding the rotor above its normal autorotational flight speed, the screw direction of the worm and its coefficient of friction being such that the blade, if unrestrained, will move thereon to a higher pitch under the influence of the centrifugal force of rotation, and the tangent of the thread angle of the worm device being in a range between 110% and 180% of the normal static coefficient of friction of the worm device, mechanism operable at the will of the pilot to move said blades on their worm devices to a reduced pitch position including means adapted to hold the blades in such reduced pitch position as against the action of centrifugal force thereon at the maximum rotational overspeed induced by said starter, and means interconnecting the last mentioned mechanism and the starter mechanism and providing for reduction of blade pitch when the starter is engaged and for increase of blade pitch when the starter is disengaged.

12. In a rotating-wing aircraft, a sustaining rotor comprising an upright tubular hub and a plurality of rotor blades, mechanism pivotally mounting said blades on said hub including individual pivots for the several blades articulating them to the hub for accommodating differential flight forces on the blades and other pivot devices outboard of said first pivots and connecting the blade roots to the first mentioned pivots and including pitch varying pivot means, control mechanism for the blade pitch extending upwardly through the tubular hub and having connections to the blades, said control mechanism comprising a central pressure fluid actuated piston or the like located axially of the hub, individual fluid pressure operated devices offset from the hub axis and coupled with the blades, and flexible fluid pressure connections from said central piston to said individual devices.

13. In an aircraft sustaining rotor, a generally upright hub, a plurality of blades pivotally mouted thereon, mechanism acting under the influence of the action of centrifugal force on the blades during rotation of the rotor for increasing effective pitch of the blades, and fluid pressure actuated mechanism for decreasing the pitch of the blades.

14. The combination, in an aircraft sustaining rotor, of a generally upright hub structure, a plurality of autorotatable blades radiating therefrom, for each blade a flapping pivot adjacent the hub, a drag pivot adjacent the blade root, an extension link between said pivots comprising a screw-threaded connection the axis of which extends substantially longitudinally of the blade, the pitch of said thread being sufficiently steep that the blade is unrestrained will move radially outwardly under the influence of centrifugal force and the inclination of the thread being such that said blade movement raises the blade pitch, and means controllable by the pilot for positively turning the blade on said screw-threaded connection to a reduced blade pitch.

15. In combination, in an aircraft, a propulsion engine, an autorotatable sustaining rotor having blades swingingly pivoted upon an upright hub, hydraulically operated mechanism for varying the effective pitch of the rotor blades including flexible connections accommodating the blade swinging movements, hydraulically operated mechanism for driving said rotor from said propulsion engine, and means connecting the latter mechanism for operation in conjunction with the first mentioned mechanism.

16. In combination, in an aircraft, a propulsion engine having a lubricating pump, an autorotatable sustaining rotor having blades pivoted upon an upright hub, mechanism for varying the effective pitch of the rotor blades, mechanism for driving said rotor from said propulsion engine including a hydraulic clutch, a controllable connection from said oil pump to said clutch, a flexible hydraulic connection extending from the craft to the rotor blade pitch varying mechanism, and a common control for both said connections.

17. The combination, in an aircraft, of a power plant, an autorotatable sustaining rotor including a generally upright hub and blades pivotally secured thereto including mechanism for varying the effective pitch of the blades, mechanism for driving said rotor from said power plant, a separately operatable control for each of said mechanisms, means for interconnecting said controls at will for common operation, and means for readily adjusting the relative timing of said two mechanisms in their interconnected operation.

18. The combination, in an aircraft, of a power plant, an autorotatable sustaining rotor including a generally upright hub and blades pivotally secured thereto including mechanism for varying the effective pitch of the blades, mechanism for driving said rotor from said power plant, a separately operatable control for each of said mechanisms, means for interconnecting said controls at will for common operation, the two controls and their interconnection being so constructed that when connected together the blade pitch is reduced when the driving mechanism is operated and is increased when said mechanism is thrown out of operation, and means for readily adjusting the relative timing of said two mechanisms in their interconnected operation.

19. In an aircraft having a sustaining rotor, a rotor hub, a plurality of blades mounted on the hub with freedom for movement to alter the pitch thereof, pivot means providing for swinging movements of the blades, and fluid pressure mechanism for controlling the blade pitch including a master Sylphon mounted on and rotatable with the hub, and individual Sylphons mounted on and movable with the blades, flexible fluid pressure connections between the master and individual Sylphons to accommodate blade swinging, and a non-rotative element for actuating the master Sylphon and extended therefrom downwardly to an operator's post in the craft.

20. In an aircraft having a sustaining rotor, a hub, a plurality of blades, a pivot for each blade mounting it on the hub with freedom for movement to change the pitch thereof, pivot means providing for swinging movements of the blades, the pitch change pivot being located outboard of said pivot means, a fluid pressure device for each blade operatively connected with the blade outboard of said first mentioned pivot for controlling pitch changing movements thereof, a fluid pressure Sylphon device nested within the hub, flexible fluid pressure connections extended from the upper end of said Sylphon device to the fluid pressure devices for the several blades to accommodate blade swinging, and an actuating element for said Sylphon device cooperating with the lower end thereof and extended downwardly therefrom to an operator's post in the craft.

21. In an aircraft sustaining rotor, a hub, a blade, and means connecting the blade to the hub including a pair of members relatively rotatable substantially about the longitudinal axis of the blade to provide for pitch change thereof, and means for effecting pitch change movement including arms secured to and projecting from said members, and a fluid pressure Sylphon device adapted to react between said arms.

22. In an aircraft sustaining rotor, a hub, a blade, and means connecting the blade to the hub including a pair of members relatively rotatable substantially about the longitudinal axis of the blade to provide for pitch change thereof, and means for effecting pitch change movement including arms secured to and projecting from said members, and a fluid pressure Sylphon device adapted to react between said arms, said Sylphon device including a bellows part and a casing therefor, the casing being mounted at one end on one arm and having an aperture in its other end through which the other of said arms projects to cooperate with the bellows part.

23. The combination, in an aircraft sustaining rotor, of a generally upright hub structure, a plurality of autorotatable blades radiating therefrom, for each blade a pair of articulation pivots for connecting the blade to the hub and positioned to provide individual blade movements in flight under the influence of variable flight forces, a pitch-varying pivot located intermediate said two flight pivots, a blade pitch controlling device at least in part mounted on the blade outboard of one of said flight pivots, and a flexible operating connection thereto to accommodate the individual blade movements on its flight pivots.

24. In an aircraft, having a sustaining rotor with a hub and blades mounted thereon for movement including pitch changing movement, mechanism for controlling the pitch change including a member movable axially of the hub and rotating therewith, and a slidable driving connection coupled to said member for actuating a rotor tachometer or the like.

25. In an aircraft having a sustaining rotor, a hub, a blade, and mechanism connecting the blade to the hub including a pair of cooperating internally and externally threaded parts one of which is connected with the blade and the other of which is connected with the hub, the parts being rotatable about an axis substantially coinciding with the longitudinal blade axis and providing for increase of blade pitch upon radially outward displacement of the blade during operation of the rotor, and controllable means for relatively rotating said parts to move the blade to a reduced pitch position and for holding the blade in a reduced pitch position during rotation of the rotor, said means being inoperative to move the blade to a reduced pitch position when the rotor is rotating at normal flight speed.

26. In an aircraft, an autorotatable rotor comprising a hub and a sustaining blade movably mounted thereon to accommodate variable flight forces, a pivot device for mounting the blade including a threaded worm device for altering the pitch setting thereof between positions of positive lift pitch and approximately zero pitch, the screw direction of the worm and its coefficient of friction being such that the blade is movable on said pivot from zero effective pitch to a positive effective pitch under the influence of the centrifugal force of rotation, and controllable mechanism for positively moving said blade to approximately the zero effective pitch position.

27. In an aircraft, an autorotatable rotor comprising a hub and a sustaining blade movably mounted thereon to accommodate variable flight forces, a pivot device for mounting the blade including a threaded worm device for altering the pitch setting thereof between positions of positive lift pitch and approximately zero pitch, the screw direction of the worm and its coefficient of friction being such that the blade is movable on said pivot from zero effective pitch to a positive effective pitch under the influence of the centrifugal force of rotation, and hydraulic mechanism mounted on the rotor and actuated by control means in the aircraft for positively moving said blade to a reduced pitch position.

28. In an aircraft having a sustaining rotor, a hub, a blade, and mechanism for connecting the blade to the hub including cooperating parts one connected with the blade and the other with the hub, the parts being relatively rotatable substantially about the longitudinal axis of the blade and having cooperating threads providing for relative axial movement during rotation thereof, the direction of threading being related to the leading and trailing edges of the blade so that axially inward movement of the blade decreases the incidence thereof and axially outward movement increases the incidence, and the threading having a lead sufficient to effect an increase of incidence by virtue of the centrifugal action of the blade, and means operative at the will of the pilot for altering the incidence during rotation of the rotor.

29. In an aircraft having a sustaining rotor, a rotor blade attaching device comprising a shaft member having one end formed with a thread, the tangent of the thread angle of which is approximately .26, a blade angle limiting stop member fixed to the shaft, and a base member fixed to the shaft member and having pivot means providing an axis for blade swinging movement.

30. In an aircraft having a sustaining rotor, a rotor blade attaching device comprising a shaft member, a blade angle limiting stop member fixed to the shaft member, and blade pivot means fixed to the shaft member and having bearing raceways spaced toward opposite sides of the shaft member.

JAMES G. RAY.

CERTIFICATE OF CORRECTION.

Patent No. 2,216,163.  October 1, 1940.

JAMES G. RAY.

It is hereby certified that error appears in the printed specification of the above numbered patent requiring correction as follows: Page 3, second column, line 37-38, for "furthere" read --further--; page 4, first column, line 53, strike out the words "or helical" and insert the same before "thread" in line 52; and second column, line 39, for "movement" read --moment--; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.